(12) United States Patent
Sundaram et al.

(10) Patent No.: US 9,007,906 B2
(45) Date of Patent: Apr. 14, 2015

(54) SYSTEM AND METHOD FOR LINK AGGREGATION GROUP HASHING USING FLOW CONTROL INFORMATION

(71) Applicant: Dell Products L.P., Round Rock, TX (US)

(72) Inventors: Shivakumar Sundaram, Tamilnadu (IN); Ramesh Balaji Subramanian, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 157 days.

(21) Appl. No.: 13/750,666

(22) Filed: Jan. 25, 2013

(65) Prior Publication Data

US 2014/0211621 A1    Jul. 31, 2014

(51) Int. Cl.
*H04L 12/24* (2006.01)
*H04L 12/891* (2013.01)
(52) U.S. Cl.
CPC ..................................... *H04L 47/41* (2013.01)

(58) Field of Classification Search
None
See application file for complete search history.

(56) References Cited

U.S. PATENT DOCUMENTS

2006/0221974 A1* 10/2006 Hilla et al. .................... 370/394
2010/0118703 A1* 5/2010 Mayhew ....................... 370/235
2014/0105218 A1* 4/2014 Anand et al. ................. 370/412

\* cited by examiner

*Primary Examiner* — Charles C Jiang
*Assistant Examiner* — George Atkins, Jr.
(74) *Attorney, Agent, or Firm* — Haynes and Boone, LLP

(57) ABSTRACT

A system and method for forwarding network traffic includes receiving a first flow of network traffic at an ingress port on a switch, collecting flow control metrics for a plurality of egress ports assigned to a link aggregation group of the switch, selecting a first egress port from the plurality of egress ports using a hashing strategy based on at least information associated with the flow control metrics, assigning the first flow to the first egress port, directing the first flow to the first egress port, and transmitting network traffic associated with the first flow using the first egress port.

18 Claims, 4 Drawing Sheets

| Egress Port | Lossless Flows | Non-Lossless Flows |
|---|---|---|
| 0 | A | 1,2 |
| 1 | B | 3,4,5 |
| 2 | C | 6,7,8 |

*FIG. 3a*

| Egress Port | Lossless Flows | Non-Lossless Flows |
|---|---|---|
| 0 | A,D | 1,2 |
| 1 | B | 3,4,5 |
| 2 | C | 6,7,8 |

*FIG. 3b*

| Egress Port | Lossless Flows | Non-Lossless Flows |
|---|---|---|
| 0 | A | 1,2 |
| 1 | B | 3,4,5 |
| 2 | C,D | 6,7,8 |

*FIG. 3c*

SYSTEM AND METHOD FOR LINK AGGREGATION GROUP HASHING USING FLOW CONTROL INFORMATION

BACKGROUND

The present disclosure relates generally to information handling systems, and more particularly to link aggregation group hashing using flow control information.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make routing, switching, and forwarding decisions in order to deliver packets of information from a source system or first network node to a destination system or second network node. Due to the size, complexity, and dynamic nature of these networks, sophisticated network switching products are often required to continuously make routing, switching, and forwarding decisions and to update forwarding information as network configurations and/or conditions change. This can be further complicated through other networking trends such as network virtualization.

Many networks utilize parallelization and other techniques to improve the forwarding function between two network nodes. By employing parallelization, redundancy is built into a network so that it is possible that more than one path exists between any two nodes. This provides suitably aware network switching products with the ability to apportion network traffic by selecting between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion in the form of link aggregation groups (LAGs), in which multiple network links are often bundled into a group to support the parallelization function. For suitably aware network switching products, the LAG can offer a flexible option to select any of the network links in the LAG for forwarding network traffic towards the next node in the path towards the traffic's final destination. And while LAGs offer additional flexibility in network topologies they also add complexity to the forwarding function.

Accordingly, it would be desirable to provide improved network switching products that can apportion network traffic among the network links in a LAG so as to improve network traffic flow using the LAG. It would also be desirable to provide improved network switching products that can apportion network traffic among the network links in a LAG based on dynamic network conditions.

SUMMARY

According to one embodiment a method of forwarding network traffic includes receiving a first flow of network traffic at an ingress port on a switch, collecting flow control metrics for a plurality of egress ports assigned to a link aggregation group of the switch, selecting a first egress port from the plurality of egress ports based on at least information associated with the flow control metrics, assigning the first flow to the first egress port, directing the first flow to the first egress port, and transmitting network traffic associated with the first flow using the first egress port.

According to another embodiment, a switch includes an ingress port configured to receive a flow of network traffic, a link aggregation group (LAG) including a plurality of egress ports, and a LAG hashing unit. The LAG hashing unit is configured to collect flow control metrics for each of the plurality of egress ports, select a first egress port from the plurality of egress ports based on at least information associated with the flow control metrics, assign the flow to the first egress port, and direct the flow to the first egress port. The switch is configured to transmit network traffic associated with the flow using the first egress port.

According to yet another embodiment, an information handling system includes a switch. The switch includes an ingress port configured to receive a flow of network traffic, a link aggregation group (LAG) including a plurality of egress ports, and a LAG hashing unit. The LAG hashing unit is configured to collect flow control metrics for each of the plurality of egress ports, select a first egress port from the plurality of egress ports based on at least information associated with the flow control metrics, assign the flow to the first egress port, and direct the flow to the first egress port. The switch is configured to transmit network traffic associated with the flow using the first egress port.

BRIEF DESCRIPTION OF THE DRAWINGS

FIG. 3a is a simplified diagram of an assignment of flows to egress ports in a LAG at a first time according to some embodiments.

FIG. 3b is a simplified diagram of an assignment of flows to egress ports in the LAG at a second time according to some embodiments.

FIG. 3c is a simplified diagram of an assignment of flows to egress ports in the LAG at a third time according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
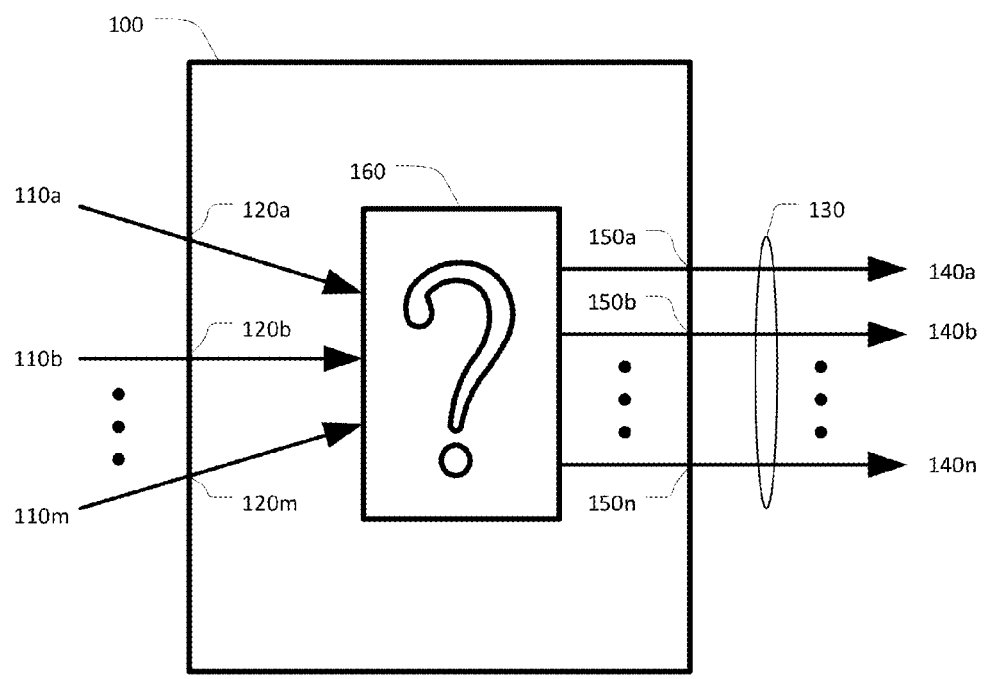
FIG. 1 is a simplified diagram of a network switching product forwarding network traffic received on multiple incoming network links using a link aggregation group according to some embodiments.

FIG. 1 is a simplified diagram of a network switching product 100 forwarding network traffic received on multiple incoming network links 110a-110m using a link aggregation group 130 according to some embodiments. As shown in FIG. 1, network switching product or switch 100 may receive network traffic on multiple incoming network links 110a-110m at corresponding ingress ports 120a-120m. Each of the incoming network links 110a-110m are capable of receiving network traffic from other nodes and/or network switching products. According to some embodiments, the network traffic may include one or more flows. Each of the one or more flows may include a stream of packets and/or packet segments being forwarded from a corresponding source node to a corresponding destination node. In some embodiments, each of the flows may be further characterized by one or more quality of service (QoS) attributes. In some embodiments, the QoS attributes may include a designation that the flow should be transmitted losslessly or non-losslessly. In some embodiments, the QoS attributes may include one or more priority designations. In some embodiments, flows with a particular QoS attribute may be forwarded to network links supporting a corresponding class of service (CoS).

The switch 100 of FIG. 1 may be configured to route, switch, or forward the flows received at ingress ports 120a-120m using a link aggregation group (LAG) 130. The LAG 130 may include one or more outgoing network links 140a-140n. Each of the one or more outgoing network links 140a-140n may transmit network traffic provided by the switch 100 at a corresponding egress port 150a-150n. According to some embodiments, the number of ingress ports M may equal the number of egress ports N. According to other embodiments, M and N may be different. Although not shown, switch 100 may further include other ingress ports for receiving network traffic and/or other egress ports for transmitting and/or forwarding network traffic.

When the switch 100 receives network traffic in a flow, it can evaluate the data in the flow to determine the desired destination for the flow. If the switch 100 determines that the flow is to be forwarded, it forwards it to an egress port according to its forwarding data structures and forwarding algorithms. In some embodiments, the egress port chosen may be the egress port with the most direct route to the desired destination. In some embodiments, the egress port may be chosen based, in part, on the QoS attributes for the flow being forwarded. In some embodiments, the egress port may be chosen based, in part, on whether it supports a class of service (CoS) consistent with the QoS attributes of the flow being forwarded. In some embodiments, where the switch 100 is utilizing a LAG, such as the LAG 130, the switch 100 may select from several egress ports 150a-150n that may provide the same route length and ability to satisfy the QoS attributes for the flow. The process of selecting an egress port in a LAG to which network traffic is to be forwarded may sometimes be referred to as hashing.

As shown in FIG. 1, switch 100 may include a LAG hashing unit 160. The LAG hashing unit 160 may receive flows from the ingress ports 120a-120m and may apportion them to the egress ports 150a-150n assigned to LAG 130 for outgoing transmission. In some embodiments, the LAG hashing unit 160 may forward the packets and/or packet segments in each of the flows to the egress ports 150a-150n in order to balance the loads handled by each egress port 150a-150n (e.g., the amount of data transmitted through each egress port 150a-150n). Several strategies and/or algorithms may be used by the LAG hashing unit 160 to apportion the flows.

One class of possible LAG hashing strategies is the class of static LAG hashing strategies. In a static LAG hashing strategy, each flow may typically be assigned to a single egress port selected from the egress ports 150a-150n. This may often be accomplished by selecting one or more fields from the headers of the packets and/or packet segments that form each flow, applying a combining function to the selected one or more fields, and then taking a modulus based on the number of egress ports 150a-150n available. As an example, the source address (e.g., the source MAC address or source IP address) and destination address (e.g., the destination MAC address or destination IP address) may be extracted from the packet as the SRC_ADDR and DEST_ADDR respectively. The SRC_ADDR and DEST_ADDR may then be combined using a combining function. Numerous combining functions are available such as XOR or some other logic function or a CRC function applied to the concatenation of the SRC_ADDR and the DEST_ADDR. The modulus of the combined result is then computed based on the number of egress ports available (e.g., N). An example of a static hashing function is shown in Equation 1, although one of ordinary skill in the art would recognize many other possible static hashing functions and/or header fields to utilize.

$$\text{Egress\_Port\_\#} = (\text{SRC\_ADDR XOR DEST\_ADDR}) \bmod N \quad \text{(Eqn. 1)}$$

Statistically over the long haul, static hashing strategies appear to provide suitable load balancing among the egress ports 150a-150n. Under the assumption that flows are equally likely to originate from any source address and be directed to any destination address, Equation 1 will, over the long term provide good load balancing. Unfortunately, this may not be a good assumption as network traffic may concentrate between a particular source address and a particular destination address. This may be further compounded if IP addresses are used in the hashing function as they are typically not assigned as randomly as MAC addresses. Traffic may also not be balanced between any two flows depending on the nature of the data being transmitted over the network. For example, the download of a very large file from a server may create a first flow with considerably more traffic than a second flow containing a short email between two other network nodes. Consequently, at least in the short term, static hashing strategies may create significant imbalances in the loads being handled by the egress ports 150a-150n. This may result in unnecessary congestion along one of the outgoing network links 140a-140n or the unnecessary dropping of packets even though other egress ports 150a-150n and outgoing network links 140a-140n in the LAG 130 have capacity to handle the unbalanced traffic.

Some of the limitations of the static hashing strategies may be alleviated with a dynamic hashing strategy. One simple dynamic hashing strategy is the round robin hashing strategy. In a round robin hashing strategy, flows may be assigned to each of the egress ports 150a-150n in rotation. The first flow may be assigned to the first egress port 150a, the second flow may be assigned to the second egress port 150b, etc. until the Nth flow may be assigned to the Nth egress port 150n. After all N egress ports 150a-150n have been assigned a flow, the process continues when the N+1st flow may be assigned to the first egress port and so on. Like the static hashing strategies, the round robin hashing strategy has good statistical properties over the long haul. However, it may not handle network traffic containing flows having different characteristics and/or QoS attributes as well over the short term. The shortcomings of the round robin hashing strategy may also be alleviated by assigning the egress ports 150a-150n using a different granularity. For example, the round robin assignment may take place at the packet and/or packet segment level, but may result in more complexity in reassembling the flows at a point further along in the network.

The static hashing strategies and the round robin hashing strategy all make hashing decisions based on a limited view of network traffic. Each of the strategies only utilizes flow-based information in making hashing decisions. The static hashing strategies rely on information in the headers contained in the flows and the round robin strategy makes assignments based on the arrival of flows, packets, and/or packet segments at the ingress ports 120a-120m. None of these strategies consider what is taking place on the egress ports 150a-150n. Some of the shortcomings of the static hashing strategies and the round robin hashing strategies might be alleviated by considering information about the egress ports 150a-150n.

One possible strategy to include information about the egress ports 150a-150n is to consider the utilization of the egress ports 150a-150n in the hashing decision. Utilization is the amount of traffic being handled by a port. An egress port handling more traffic typically has a higher utilization than an egress port handling less traffic. If two egress ports have the same capacity, then the egress port with a higher utilization is using more of its capacity and is less able to handle any new flow that may be assigned to it. By monitoring the amount of traffic handled by each of the egress ports 150a-150n, as measured by the utilization of each of the egress ports 150a-150n, it may be possible to identify an egress port with the lowest utilization as the egress port to which the next flow could be assigned. This may alleviate the short-term imbalances caused by flows having different characteristics and/or QoS attributes that are observed when using static hashing strategies and/or the round robin hashing strategy.

Egress port utilization, however, may not provide the most accurate picture of network traffic activity. Network traffic needs both a sender and a receiver. Most networks are configured so that both the sender and the receiver must cooperate in the exchange of flow, packets, and/or packet segments. For example, many networks do not allow a sender to transmit network traffic without limit. Each receiver has finite resources due to outgoing traffic limits, buffer capacity, computing power limits, and the like. Consequently, in many networks supporting full duplex communication, the receiver is able to send flow control information to the sender. In some embodiments, flow control may take the form of simple XOFF and XON messages, where the XOFF message tells the sender to stop transmitting and the XON message tells the sender that transmitting may resume. In some embodiments, flow control may take the form of source quench messages that asks a sender to slow down the amount of network traffic transmitted or to cease transmitting temporarily. For example, the source quench message may be a source quench message of the Internet Control Message Protocol (ICMP). In some embodiments, flow control may take the form of a pause message that asks the sender to stop transmitting for a period of time specified in the pause message. For example, the pause message may be a PAUSE frame supported by various Ethernet protocols. In some embodiments, the pause message may apply only to flows having a specific QoS. For example, the pause message may apply only to flows marked as lossless to guarantee that they are not dropped at the receiver. In some embodiments, the pause message may take the form of a priority flow control pause frame as used in Fibre Channel over Ethernet (FCoE).

Use of flow control information in the hashing strategy may have advantages over egress port utilization. Unlike utilization that only considers how much data is being transmitted over the corresponding egress port, use of flow control information considers the ability of the receiver at the other end of the corresponding outgoing network link 140a-140n to handle any additional traffic. Relying merely on utilization may be misleading as an egress port that is being constantly paused by flow control may show a very low utilization suggesting that it is able to handle more traffic than the corresponding receiver is prepared to receive. Consequently, having the LAG hashing unit 160 consider flow control information in the hashing strategy would be advantageous.

Figure 2A:
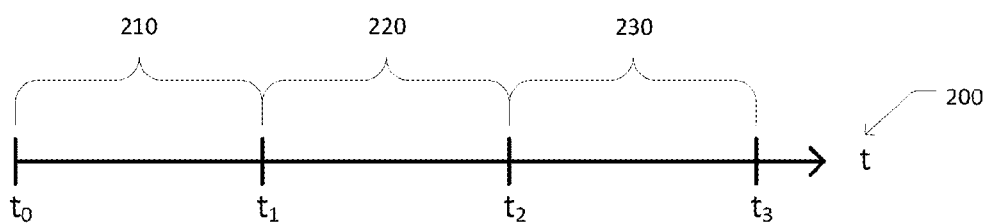
FIGS. 2a and 2b are simplified diagrams of windowing strategies for incorporating flow control information in a LAG hashing strategy according to some embodiments.

FIG. 2a is a simplified diagram of a windowing strategy for incorporating flow control information in a LAG hashing strategy according to some embodiments. As shown in FIG. 2a, a time line 200 may be divided into a series of windows of approximately a same duration. A first window 210 may extend from time $t_0$ to time $t_1$. A second window 220 may extend from time $t_1$ to time $t_2$. A third window 230 may extend from time $t_2$ to time $t_3$. In some embodiments, the time duration between time $t_0$ and time $t_1$, the time duration between time $t_1$ and time $t_2$, and the time duration between time $t_2$ and time $t_3$ may all be approximately the same. In some embodiments, the time duration of the first 210, second 220, and third 230 windows may be as short as 1 μs or shorter. In some embodiments, the time duration of the first 210, second 220, and third 230 windows may be approximately 1 ms. In some embodiments, the time duration of the first 210, second 220, and third 230 windows may be as long as 100 ms or longer, including as long as several seconds.

According to some embodiments, a first number of flow control messages (e.g., XOFF, pause messages, or source quench messages) received at an egress port from a corresponding receiver may be counted during the first window 210. The first number of flow control messages may be used by the LAG hashing unit 160 to determine the relative availability of the egress port to handle a new flow that arrives during the second window 220. In some embodiments, an egress port that receives fewer flow control messages may be better able to handle the new flow. A second number of flow control messages received at the egress port from the corresponding receiver may be counted during the second window 220 and may be used by the LAG hashing unit 160 during the third window 230. A third number of flow control messages received at the egress port from the corresponding receiver may be counted during the second third 230 and may be used by the LAG hashing unit 160 during a window that begins at $t_3$.

According to some embodiments, a first down time for an egress port may be determined by monitoring flow control messages (e.g., XOFF, XON, pause messages, or source quench messages) received at the egress port from a corresponding receiver during the first window 210. In some embodiments, the first down time may be determined by monitoring the amount of time during the first window 210 for which an XOFF has been received without a following XON. In some embodiments, the first down time may be determined by counting a number of source quench messages received during the first window 210 and assigning a duration for each. In some embodiments, the first down time may be determined by totaling each period of time specified in each pause message received during the first window 210. The first down time may be used by the LAG hashing unit 160 to determine the relative availability of the egress port to handle a new flow that arrives during the second window 220. In some embodiments, an egress port with a smaller first down time may be better able to handle a new flow that arrives during the second window 220. Similar monitoring and computations may be applied during the second window 220, the third window 230, and beyond.

Network traffic may be subject to local fluctuations due to the aperiodic arrival of new flows and/or network conditions both upstream and downstream of the switch 100. According to some embodiments, a history function may be used to reduce fluctuations observed in the flow control metrics (e.g., the various numbers of flow control messages or the various down times). The history function may smooth out the fluctuations by combining flow control metrics from more than one window. In some embodiments, the history function may average the flow control metrics from the most recent two, three, or even more windows. In some embodiments, the history function may apply a non-uniform weighting that places more emphasis on a more recent flow control metric than on a less recent flow control metric. In some embodiments, the history function may use exponential smoothing. If hash_value(i) is the flow control metric to be used during the ith window, then the hash_value(i+1) for use in the i+1st window may be computed from the flow control metric measured during the ith window (FCM(i)) according to Equation 2 where $0 \leq \alpha < 1$. A value of $\alpha=0$ is equivalent to not using a history function and a value of $\alpha$ near 1 places little emphasis on the most recently measured flow control metric.

$$\text{hash\_value}(i+1) = \alpha * \text{hash\_value}(i) + (1-\alpha) * \text{FCM}(i) \quad \text{(Eqn. 2)}$$

Figure 2B:
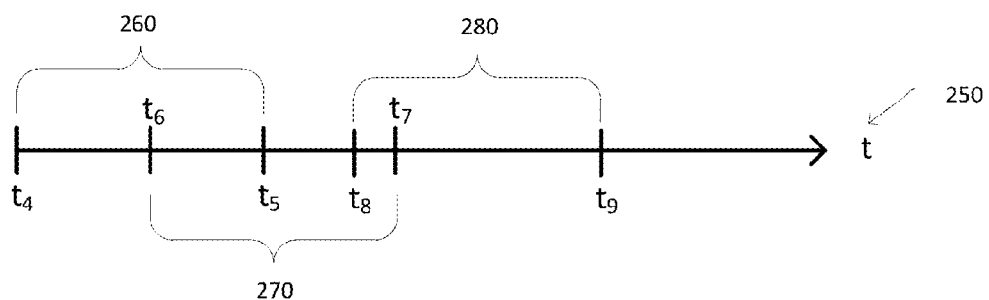

FIG. 2b is a simplified diagram of a windowing strategy for incorporating flow control information in a LAG hashing strategy according to some embodiments. As shown in FIG. 2b, a time line 250 may be divided into a series of sliding windows of approximately the same duration. A fourth window 260 may extend from time $t_4$ to time $t_5$. A fifth window 270 may extend from time $t_6$ to time $t_7$. A sixth window 280 may extend from time $t_8$ to time $t_9$. In some embodiments, the time duration between time $t_4$ and time $t_5$, the time duration between time $t_6$ and time $t_7$, and the time duration between time $t_8$ and time $t_9$ may all be approximately the same. In some embodiments, the time duration of the fourth 260, fifth 270, and sixth 280 windows may be as short as 1μs or shorter. In some embodiments, the time duration of the fourth 260, fifth 270, and sixth 280 windows may be approximately 1 ms. In some embodiments, the time duration of the fourth 260, fifth 270, and sixth 280 windows may be as long as 100 ms or longer, including as long as several seconds. As shown in FIG. 2b, the use of sliding windows 250, 260, and 270 may provide a more flexible way to compute the flow control metrics (e.g., the various numbers of flow control messages or the various down times for each of the sliding windows). In some embodiments, when the LAG hashing unit 160 requires a new flow control metric at time $t_5$ (e.g., when a new flow arrives), it may determine the flow control metric during the fourth window 260 by considering the flow control messages received at the corresponding egress port during the last window duration. If a new flow control metric is needed at time $t_7$, the flow control metric may be determined from the fifth window 270. If a new flow control metric is needed at time $t_9$, the flow control metric may be determined from the sixth window 280.

According to some embodiments, the flow control metrics may be determined based on QoS attributes. In some embodiments, the flow control messages may be applied only to flows having a specific QoS. In some embodiments, the LAG hashing unit 160 may only consider flow control metrics for the egress ports 150a-150n that support a CoS that is consistent with the corresponding QoS attributes of a flow that is to be assigned to one of the egress ports 150a-150n.

As discussed above and further emphasized here, FIGS. 2a and 2b are merely examples, which should not unduly limit the scope of the claims. One of ordinary skill in the art would recognize many variations, alternatives, and modifications. According to some embodiments, a time duration of each of the first 210, second 220, third 230, fourth 260, fifth 270, and sixth 280 windows may be different. According to some embodiments, a time duration of each of the first 210, second 220, third 230, fourth 260, fifth 270, and sixth 280 windows may become longer or shorter as the LAG hashing unit 160 adapts to variations in network traffic.

According to some embodiments, the LAG hashing unit 160 may consider more than flow control metrics in the LAG hashing strategy. In some embodiments, egress port utilization may be considered by the LAG hashing unit 160. In some embodiments, one or more static LAG hashing strategies may be considered by the LAG hashing unit 160. In some embodiments, the number of flows assigned to each egress port may be considered by the LAG hashing unit. In some embodiments, other metrics may be considered by the LAG hashing unit 160. According to some embodiments, the LAG hashing unit 160 may consider multiple metrics in the LAG hashing strategy. In some embodiments, the LAG hashing unit may consider one or more factors selected from a list consisting of flow control metrics, egress port utilization, static LAG hashing strategies, number of flows assigned to each egress port, and the like. In some embodiments, the LAG hashing unit may assign different weights to the one or more factors selected to be part of the LAG hashing strategy.

FIG. 3a is a simplified diagram of an assignment of flows to egress ports in a LAG at a first time according to some embodiments. As shown in FIG. 3a, a LAG (e.g., the LAG 130) from a network switching unit (e.g., the switch 100) includes three egress ports 0, 1, and 2 (e.g., the egress ports 150a-150n). Although only three egress ports are shown in FIG. 3a, the LAG may have N egress ports. Various flows have been assigned to egress ports 0, 1, and 2, including flows with a lossless QoS and a non-lossless QoS. At the first time shown in FIG. 3a, lossless flow A and non-lossless flows 1 and 2 are assigned to egress port 0 and packets and/or subpackets from each of those flows is being forwarded for transmission by egress port 0. Lossless flow B and non-lossless flows 3, 4, and 5 are assigned to egress port 1 and lossless flow C and non-lossless flows 6, 7, and 8 are assigned to egress port 2. In accordance with certain embodiments, the network switching unit is monitoring flow control metrics for egress ports 0, 1, and 2. In some embodiments, the flow control metrics may be the numbers of flow control messages received by each egress port 0, 1, and 2 over a time window. In some embodiments, the flow control metrics may be the various down times for each egress port 0, 1, and 2. In some embodiments, separate flow control metrics may be kept for the lossless and non-lossless QoS for each of the egress ports 0, 1, and 2. At the first time shown in FIG. 3a, a new lossless flow D may be directed to the network switching unit for forwarding. In order to hash or assign the lossless flow D to one of the egress ports 0, 1, or 2, the LAG hashing unit (e.g., the LAG hashing unit 160) of the network switching unit may consider the flow control metrics it is monitoring for its egress ports 0, 1, and 2. Based at least on the flow control metrics from the first time, the LAG hashing unit may determine that lossless flow D should be hashed to egress port 0.

FIG. 3b is a simplified diagram of an assignment of flows to egress ports in the LAG at a second time according to some embodiments. As shown in FIG. 3b, the lossless flow D that arrived at the first time has been hashed to egress port 0. At the second time, lossless flows A and D and non-lossless flows 1 and 2 are assigned to egress port 0, lossless flow B and non-lossless flows 3, 4, and 5 are assigned to egress port 1, and lossless flow C and non-lossless flows 6, 7, and 8 are assigned to egress port 2. According to some embodiments, the LAG hashing unit may periodically reevaluate the hashing of flows to the egress ports 0, 1, and 2. For example, during the time interval between the first time and the second time, egress port 0 may have received an increased number of flow control messages and/or seen increased down time. As a result, the LAG hashing unit may observe that the flow control metrics monitored at the second time for egress ports 0, 1, and 2 indicate that it may be advantageous to reassign network traffic from egress port 0 to egress port 2.

FIG. 3c is a simplified diagram of an assignment of flows to egress ports in the LAG at a third time according to some embodiments. As shown in FIG. 3c, based at least in part on the flow control metrics of the second time, the lossless flow D has been reassigned and is now hashed to egress port 2. Thus, at the third time, lossless flow A and non-lossless flows 1 and 2 are assigned to egress port 0, lossless flow B and non-lossless flows 3, 4, and 5 are assigned to egress port 1, and lossless flows C and D and non-lossless flows 6, 7, and 8 are assigned to egress port 2.

Figure 4:
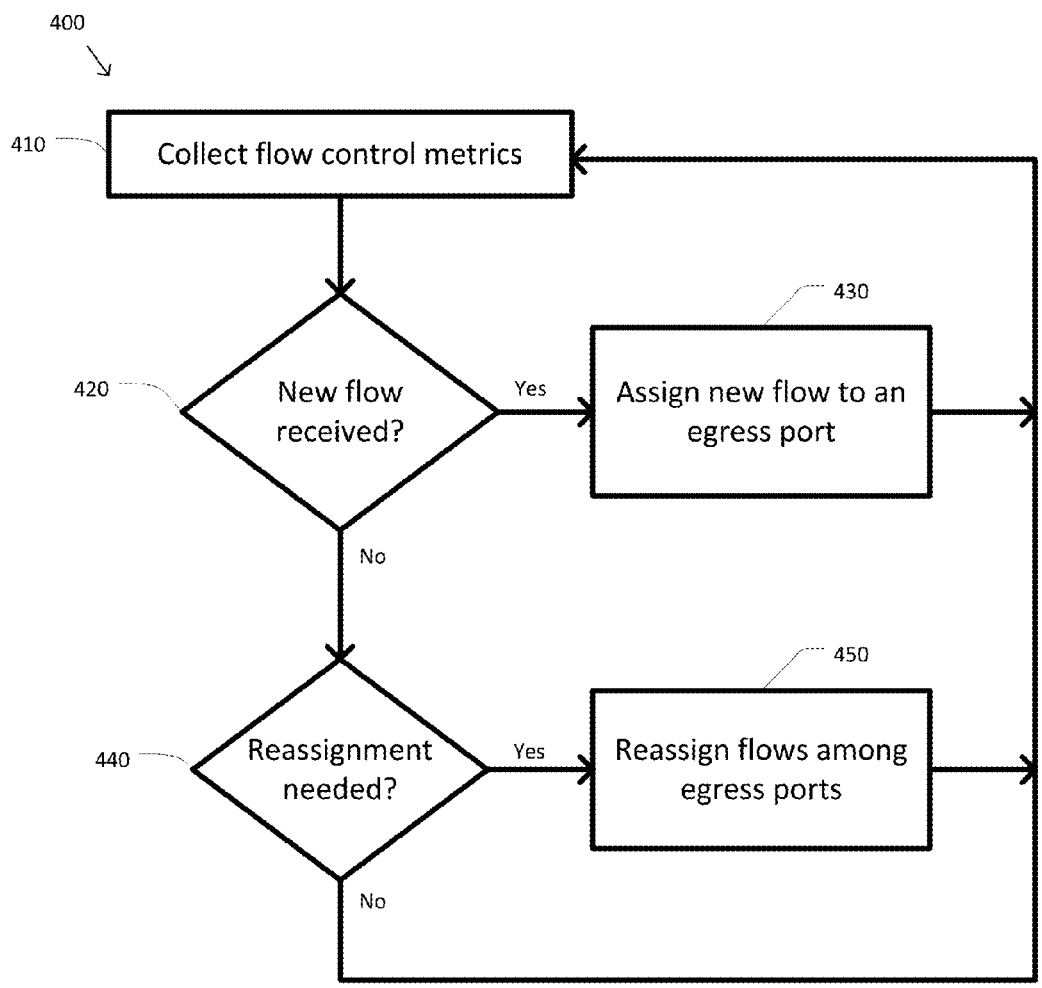
FIG. 4 is a simplified diagram showing a method of hashing flows in a network switching unit according to some embodiments.

FIG. 4 is a simplified diagram showing a method 400 of hashing flows in a network switching unit according to some embodiments. As shown in FIG. 4, the method 400 includes a process 410 for collecting flow control metrics, a process 420 for determining if a new flow has been received, a process 430 for assigning a new flow to an egress port, a process 440 for determining if flows should be reassigned, and a process 450 for reassigning flows among egress ports. According to certain embodiments, the method 400 of hashing flows in a network switching unit can be performed using variations among the processes 410-450 as would be recognized by one of ordinary skill in the art. For example, in some embodiments, one or more of the processes 440 and 450 are optional and may be omitted. In some embodiments, one or more of the processes 410-450 of method 400 may be implemented, at least in part, in the form of executable code stored on non-transient, tangible, machine readable media that when run by one or more processors (e.g., the switch 100 and/or the LAG hashing unit 160) may cause the one or more processors to perform one or more of the processes 410-450.

At the process 410, the network switching unit (e.g., switch 100) collects flow control metrics for egress ports (e.g., the egress ports 150a-150n) assigned to a LAG (e.g., the LAG 130). In some embodiments, the flow control metrics may include numbers of flow control messages received by each of the egress ports in the LAG during a time window. In some embodiments, the flow control metrics may include down times for each of the egress ports in the LAG during a time window. In some embodiments, the time windows may occur at regular intervals. In some embodiments, the time windows may be sliding and include flow control information for only a most recent time window duration. In some embodiments, the flow control metrics may include history information from more than one time window. In some embodiments, the flow control metrics may be collected separately for each QoS supported by each of the egress ports. In some embodiments, the flow control metrics may be used by the network switching unit to determine a particular one of the egress ports that may be best able to support more network traffic. In some embodiments, the network switching unit may include a LAG hashing unit (e.g., LAG hashing unit 160). In some embodiments, the flow control metrics are collected at regular time intervals. In some embodiments, the flow control metrics are collected on an as needed basis.

At the process 420, the network switching unit determines if a new flow has been received. In some embodiments, the new flow may include packets and/or packet segments for network traffic received at an ingress port (e.g., one of the ingress ports 120a-120m) and to be forwarded to one of the egress ports in the LAG. In some embodiments, the new flow includes network traffic from a combination of source and destination nodes not currently being forwarded through the LAG. In some embodiments, the new flow includes QoS attributes. If a new flow has been received at process 420, the method 400 moves to process 430. If a new flow has not been received at process 420, the method 400 moves to process 440.

At the process 430, the network switching unit assigns or hashes the new flow to an egress port. In some embodiments, the new flow may be assigned to the egress port based, at least in part, on the flow control metrics collected in process 410. In some embodiments, the new flow may be assigned to the egress port based, at least in part, on the egress port that has been determined to be the best able to support the new flow. In some embodiments, the new flow may be assigned to the egress port having a best flow control metric from among the collected flow control metrics. In some embodiments, the new flow may be assigned to the egress port based, at least in part, on the QoS attributes of the new flow.

At the optional process 440, the network switching unit determines if any of the flows should be reassigned to different egress ports. In some embodiments, the flow control metrics collected in process 410 may be used to determine if any of the flows should be reassigned. In some embodiments, the determination if any of the flows should be reassigned may be based, at least in part, on whether a first egress port has a first flow control metric that is better than a second flow control metric of a second egress port. In some embodiments, the determination if any of the flows should be reassigned may be based, at least in part, on whether a third egress port has a third flow control metric that has become poorer since the last time process 440 made a determination. In some embodiments, the determination may be made based, at least in part, on a change in a flow control metric that exceeds an absolute threshold. In some embodiments, the determination may be made based, at least in part, on a percentage change in a flow control metric that exceeds a percentage threshold. In some embodiments, the determination may be made based on any suitable heuristic function.

If a reassignment is determined to be needed at process 440, the method 400 moves to process 450. If a reassignment is determined to not be needed at process 440, the method 400 moves back to process 410. In some embodiments, the determination of process 440 occurs at regular time intervals.

At the optional process 450, the network switching unit reassigns flows among the egress ports of the LAG. In some embodiments, a flow may be moved from a first egress port having a poorest flow control metric among the collected flow control metrics to a second egress port having a best flow control metric from among the collected flow control metrics. In some embodiments, more than one flow is reassigned among the egress ports.

Some embodiments of switch 100 and LAG hashing unit 160 include non-transient, tangible, machine readable media that include executable code that when run by one or more processors may cause the one or more processors to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, FIG. 4 is merely an example, which should not unduly limit the scope of the claims. One of ordinary skill in the art would recognize many variations, alternatives, and modifications. According to some embodiments, the process 410 for collecting flow control metrics occurs only if the process 420 determines that a new flow has been received. In some embodiments, the process 410 occurs between the process 420 and the process 430.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of forwarding network traffic, the method comprising:
   receiving a first flow of network traffic at an ingress port on a switch;
   receiving flow control messages at a plurality of egress ports assigned to a link aggregation group of the switch;
   determining flow control metrics for the plurality of egress ports, the flow control metrics including aggregate properties of the received flow control messages;
   selecting a first egress port from the plurality of egress ports based on at least information associated with the flow control metrics;
   assigning the first flow to the first egress port;
   directing the first flow to the first egress port; and
   transmitting network traffic associated with the first flow using the first egress port; wherein the process of determining flow control metrics includes totaling each period of pause time specified in each pause message received at the first egress port.

2. The method of claim 1 wherein the process of determining flow control metrics includes counting an aggregate number of flow control messages received at the first egress port.

3. The method of claim 1 wherein the process of determining flow control metrics includes aggregating properties of the flow control messages received during a first time window.

4. The method of claim 3 wherein the process of selecting a first egress port includes using information associated with the determined flow control metrics based on the flow control messages received during the first time window to make the selection after the first time window.

5. The method of claim 3 wherein the process of determining flow control metrics further includes aggregating properties of the flow control messages received during a second time window after the first time window.

6. The method of claim 5 wherein the second time window begins at the end of the first time window.

7. The method of claim 5 wherein a first duration of the first time window and a second duration of the second time window are the same.

8. The method of claim 5 wherein the process of selecting a first egress port includes:
   using information associated with the flow control metrics determined based on flow control messages received during the first time window to make the selection during the second time window; and
   using information associated with the flow control metrics determined based on flow control messages received during the second time window to make the selection after the second time window.

9. The method of claim 5 wherein the process of selecting a first egress port includes combining information associated with the flow control metrics collected during the first time window and the second time window to make the selection after the second time window.

10. The method of claim 1 wherein the flow control messages are each selected from a group consisting of XOFF, XON, source quench, and pause messages.

11. The method of claim 1 wherein the process of determining flow control metrics includes determining class of service flow control metrics for each class of service supported by the first egress port.

12. The method of claim 11 wherein the process of selecting a first egress port further includes selecting the first egress port based on at least information associated with the class of service flow control metrics that are associated with a class of service that corresponds to a quality of service attribute of the first flow.

13. The method of claim 1 wherein the process of selecting a first egress port further includes selecting the first egress port based on at least information associated with a utilization of each of the plurality of egress ports.

14. The method of claim 1 wherein the process of selecting a first egress port further includes selecting the first egress port based on at least information associated with data selected from within the first flow.

15. The method of claim 1, and further comprising reassigning a second flow from a second egress port selected from the plurality of egress ports to a third egress port selected from the plurality of egress ports based on at least information associated with the flow control metrics.

16. The method of claim 1, and further comprising comparing flow control metrics associated with the first egress port to flow control metrics associated with a second egress port selected from the plurality of egress ports.

17. A switch, the switch comprising:
 an ingress port configured to receive a flow of network traffic;
 a link aggregation group (LAG) including a plurality of egress ports configured to receive flow control messages; and
 a LAG hashing unit configured to:
  determine flow control metrics for each of the plurality of egress ports, the flow control metrics including aggregate properties of the received flow control messages;
  select a first egress port from the plurality of egress ports based on at least information associated with the flow control metrics;
  assign the flow to the first egress port; and
  direct the flow to the first egress port;
 wherein the switch is configured to transmit network traffic associated with the flow using the first egress port;
 wherein to determine the flow control metrics, the LAG hashing unit further totals each period of pause time specified in each pause message received at the first egress port.

18. An information handling system comprising:
 a switch, the switch including:
  an ingress port configured to receive a flow of network traffic;
  a link aggregation group (LAG) including a plurality of egress ports configured to receive flow control messages; and
  a LAG hashing unit configured to:
   determine flow control metrics for each of the plurality of egress ports, the flow control metrics including aggregate properties of the received flow control messages;
   select a first egress port from the plurality of egress ports based on at least information associated with the flow control metrics;
   assign the flow to the first egress port; and
   direct the flow to the first egress port;
  wherein the switch is configured to transmit network traffic associated with the flow using the first egress port;
  wherein to determine the flow control metrics, the LAG hashing unit further totals each period of pause time specified in each pause message received at the first egress port.

\* \* \* \* \*